Figure 1:
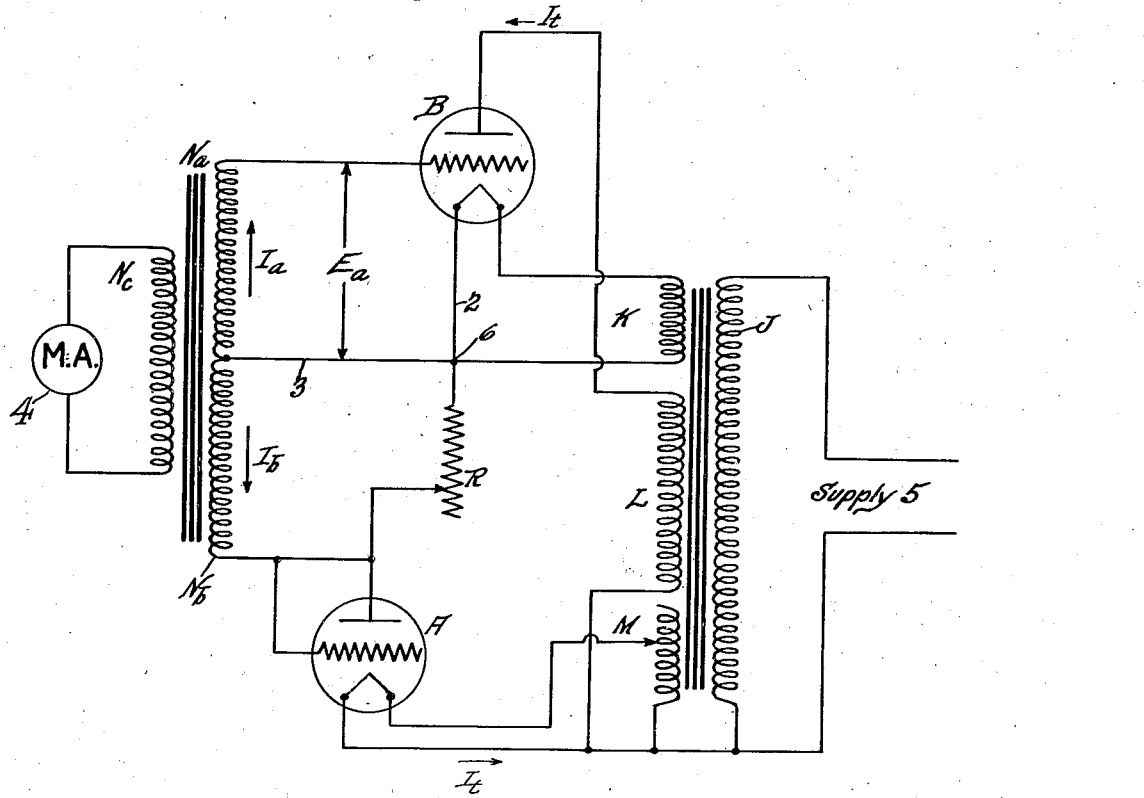

April 9, 1940.  V. H. LAUGHTER  2,196,466

RADIO TUBE TESTING APPARATUS

Filed April 5, 1937  2 Sheets-Sheet 1

Inventor
Victor H. Laughter
by Brunnga & Sutherland,
His Attorneys.

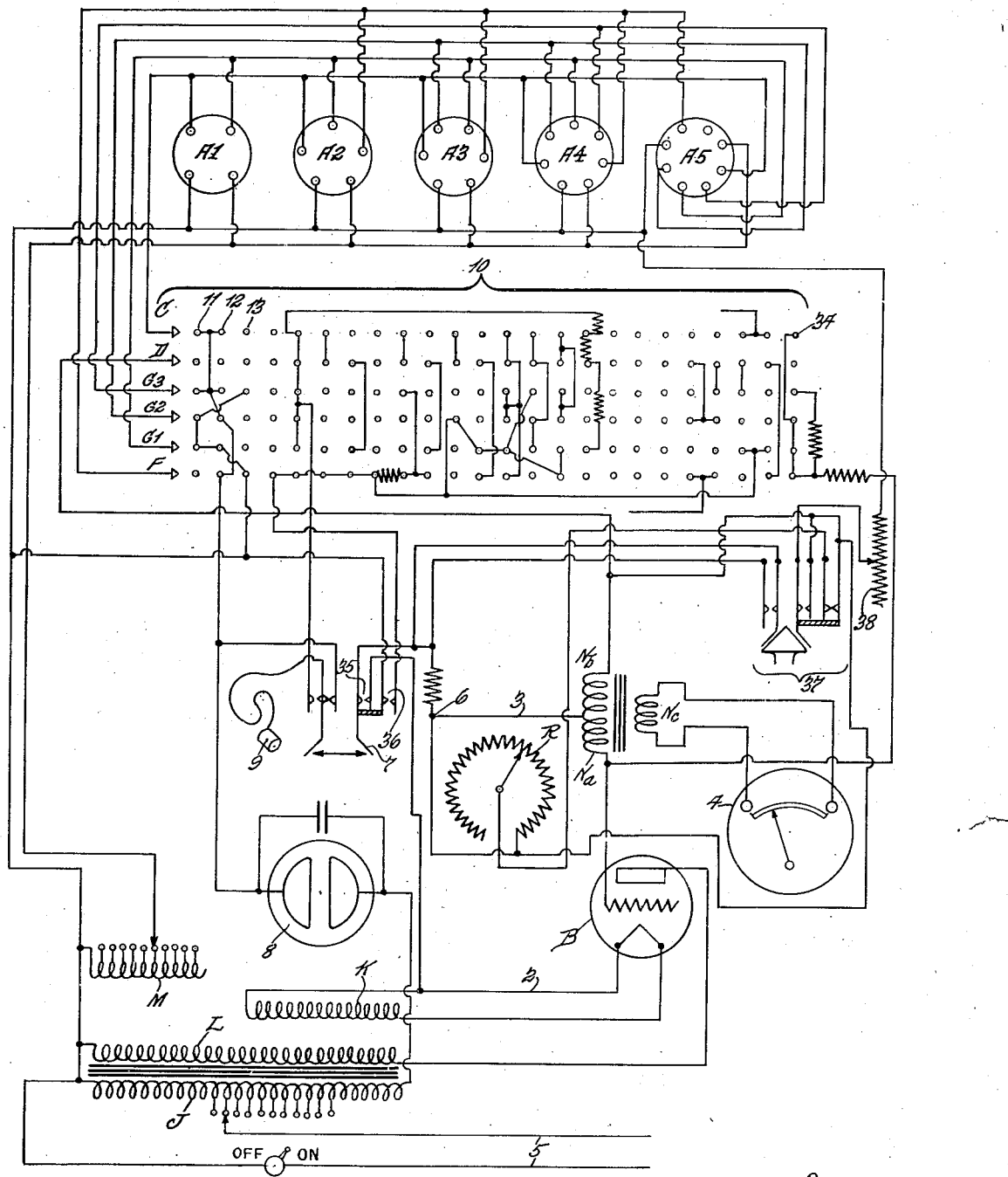

Patented Apr. 9, 1940

2,196,466

UNITED STATES PATENT OFFICE 2,196,466

RADIO TUBE TESTING APPARATUS

Victor H. Laughter, Shelby County, Tenn., assignor of one-half to Harry T. Wilson, Memphis, Tenn.

Application April 5, 1937, Serial No. 135,025

7 Claims. (Cl. 250—27)

This invention pertains to a method and apparatus for testing radio tubes in order to determine whether or not their characteristics are such as to render them suitable for use.

In the manner of testing radio tubes employed heretofore the simple emission test has been depended upon to indicate the quality of the tube. Testing devices are usually so arranged that the indicator thereof may be calibrated by testing a normal tube, and thereafter tubes to be tested are simply compared with the normal calibrating tube. Such tests are often unreliable because the different makes of radio tubes are widely different in their emission characteristics. Two tubes of the same type but of different makes may show up very differently on such a test, one tube showing a very high emission and the other a considerably lower value, although both are good tubes and suitable for use in a radio set. Under previous methods of testing such a low reading tube might be discarded as bad according to the test's indication.

One of the objects of this invention, therefore, is to provide a method and apparatus whereby bad tubes may be segregated from good tubes in spite of a considerable variation between good tubes.

Another object is to provide a method and apparatus which will function to group together good tubes, although they may have different characteristics, and to separate them from bad tubes which have become run down by use.

Another object is to provide such apparatus including a ballast tube and a circuit therefor so arranged that the differences between good tubes will be minimized while the difference between good tubes and bad tubes will be distinctly indicated.

Further objects will appear from the following description taken in connection with the accompanying drawings in which Figure 1 is a diagram of the basic circuit embodying this invention and Figure 2 is a complete connection diagram of a tube testing set embodying this invention.

In accordance with this invention the test's indication is derived from the grid-plate current of the tube under test under certain conditions imposed by the testing circuit. Considering the test as applied to a single type of tube, the various makes of tubes of a single type will show different emission characteristics. While one tube will show a high grid-plate current another will show a considerably lower grid-plate current under the same voltage conditions, both such tubes being good tubes. Both such tubes will show the same type of grid-plate current characteristic curve although the curve of the high reading tube may be somewhat higher than that of the low reading tube. A bad tube will show a very low characteristic curve having a low saturation point. The present invention is designed to distinguish between good and bad tubes having the above characteristics.

Referring to the accompanying drawings, A indicates the tube under test having its plate and grid connected together in the ordinary manner. B represents a ballast tube which is preferably a suitable triode having a long emission life. The test circuit is supplied by a transformer having a primary winding J and three independent secondary windings K, L and M. The winding K is connected to supply the filament of the tube B. The winding M is connected to supply the filament of the tube A. The winding L is connected to supply the plate voltage for the ballast tube B.

The tubes A and B are connected in series with each other and with a pair of parallel circuits, one of which extends from the filament of the tube B via a conductor 2 through a resistance R to the plate of the tube A. The other branch of the parallel circuit includes two halves, $N_a$ and $N_b$ of the primary winding of a transformer. The midpoint between these two halves of the winding is connected by a conductor 3 to a point 6 between the resistance R and the filament of the tube B. This latter transformer has a secondary winding $N_c$ to which an alternating-current milli-ammeter 4 is connected.

With the winding J connected to a suitable supply 5 of alternating current, heating current will be supplied to the filaments of the tubes A and B and the winding L will supply an outside voltage of about 180 volts to the series circuit. This will cause a test current $I_t$ to flow in that circuit. This represents the plate current of the tube B and the grid-plate current of the tube A. This current divides at the point 6, a part thereof, $I_b$, flowing through the half $N_b$ of the primary winding of the indicating transformer and the remainder going through the resistance R. The resistance R is adjustable so that the current $I_b$ may be adjusted for calibrating the device. These currents then recombine to flow through the tube A. The flow of the current $I_b$ through the winding $N_b$ causes a voltage $E_a$ to be induced in the other half $N_a$ of this winding by ordinary transformer action. The voltage $E_a$ thus induced provides a grid bias for the tube B.

This grid bias is positive and causes a grid current $I_a$ to flow in the grid circuit of the tube B. As the currents $I_a$ and $I_b$ flow in opposite directions around the core of the indicating transformer, the current in the secondary winding $N_c$ which flows through the milli-ammeter 4 will correspond to the difference between the curents $I_b$ and $I_a$.

The operation of this circuit is as follows. The tube B is a permanent part of the testing set. In order to calibrate the set for a given type of tube, a good tube of that type is inserted as the tube A. Preferably one of the lower reading good tubes is selected for the purpose of calibration. With this sample tube in the circuit at A the resistance R is adjusted until a reading is obtained on the milli-ammeter 4 at the desired portion of the scale thereof to represent a normal reading for a good tube. This adjustment of the resistance R is then noted and recorded as the standard setting of this resistance for a given type of tube. Such a setting is determined for each type of tube to be tested. The circuit so calibrated may now be used to test tubes.

If now a good tube is tested having the same characteristics as the calibrating tube, the reading on the meter 4 will, of course, be the same. If a tube is tested which has a higher emission than the calibrating tube the current $I_t$ will be increased over the calibrating value thereof. This will be followed by a corresponding increase in the values of the current $I_b$ and the current in the resistance R. These two currents, however, will remain in substantially the same ratio to each other. The increase in the current $I_b$ will cause a slight increase in the voltage $E_a$. This in turn increases the positive grid bias of the tube B and, as a consequence, this tube will assume a greater proportion of the voltage supplied by the winding L. Consequently, the voltage supplied to the tube A will be slightly decreased, and such decrease will tend to compensate for the increase in grid-plate current due to higher emission in the tube under test. Furthermore, while the current $I_b$ has been increased somewhat, the current $I_a$ is also increased so that the difference between these currents, as represented by the indication of the meter 4 will be increased but slightly over the calibrated value. Accordingly, all good tubes of this type will show indications on the meter 4 within a comparatively narrow range and, therefore, a range may be set off upon this meter scale within which the indications will show good tubes.

If now a run down tube is placed in the circuit at A, the current $I_t$ will be greatly reduced. At the same time the tube A will assume a greater proportion of the voltage supplied by the winding L and, consequently the voltage supplied to the rest of the circuit including the tube B is reduced. The current $I_b$ is somewhat reduced and, therefore, the voltage $E_a$ is reduced correspondingly. This represents a reduction in the positive grid bias of the tube B. The adjustment may be made so that this reduction in the grid bias brings the current $I_a$ down to the curved portion of the grid current characteristic curve for the tube B. Accordingly, the current $I_a$ is reduced in considerably less proportion than is the current $I_b$. As a consequence, the difference between $I_b$ and $I_a$ represented by the indication of the meter 4 is reduced. As this difference is a small quantity as compared with the values of $I_b$ and $I_a$, the change in this difference will be comparatively great. Accordingly, a bad tube at A will show a low reading on the meter 4.

It will be noted that the action of the ballast tube B may be so controlled as to take advantage of the change in shape of the grid current characteristic. The setting of the resistance R is so adjusted that the normal value of $I_a$ is approximately at the foot of the straight portion of the grid current curve for the tube B. Accordingly, when the good tube is tested the current $I_a$ will be at or above this point, while when a bad tube is tested, the current will be below that point. By this arrangement a different rate of change of the current $I_a$ is obtained when good tubes are tested than when bad tubes are tested.

Figure 2 is a connection diagram for a practical tube testing set. In this figure A—1, A—2, A—3, A—4 and A—5 represent tube sockets for tubes to be tested, different sockets having different numbers of electrodes for handling the different types of tubes. A multiple pole rotary switch 10 is provided for automatically making the necessary changes in connections to accommodate the different standard tests on the different types of tubes. The contacts C, D, F, G—1, G—2 and G—3 are stationary and are arranged to make contact with any vertical row of moving contacts 11, 12, 13 etc., as the switch is rotated. The winding M of the supply transformer may be provided with a series of taps and a switch whereby the voltage supply may be adjusted to suit the type of tube under test. This winding is connected to all of the filament terminals of the sockets A—1 to A—5 inclusive. A push button switch 7 may be pressed to close the circuit for the test. A neon glow lamp 8 providing an indicator for leaks and short circuits is connected to the contacts 11, 12, and 13 so that by moving the switch 10 from one of these contacts to the other, tests for leakage or short circuits between the several tube elements may be obtained. A grid cap contact 9 is also connected to the indicator 8 through the switch 7. When the switch 7 is depressed the contact 35 thereof connects the midpoint of the indicating transformer with the filament of the ballast tube B, while the contact 36 connects the arm F which is connected to the common cathode of all the tube sockets, to the common ground of the supply transformer.

A switch 37 may be provided to test for normal voltage. By depressing this switch the rheostat R is cut out and the voltage of the winding K is placed upon half of the indicating transformer and through an adjustable resistance 38 to the common ground 40. The resistance 38 is adjusted to give a definite indication on the meter 4 when the supply voltage is normal.

While a certain theory of action, particularly with reference to tube characteristics, has been used in the foregoing description, it will be understood that this is for the purpose of clarity in explanation, and that the invention is not limited to any particular theory or tube characteristic, nor to any specific point on such characteristic, otherwise than may be called for by the appended claims.

It is obvious that various changes may be made, within the scope of the appended claims, in the details of construction without departing from the spirit of this invention; it is to be understood, therefore, that this invention is not limited to the specific detalis shown and/or described.

Having thus described the invention, what is claimed is:

1. Apparatus for testing thermionic emission tubes, comprising, a ballast tube having plate, grid and filament electrodes, a circuit connecting said ballast tube with the tube under test, means for impressing a supply voltage on said circuit, means in said circuit imposing on said ballast tube a grid current varying in accordance with the test current of the tube under test, and means actuated unequally by rise and fall of such grid current arranged to indicate the condition of the tube under test.

2. Apparatus for testing thermionic emission tubes, comprising, a ballast tube having plate, grid and filament electrodes, a circuit connecting said ballast tube with the tube under test, means for impressing a supply voltage on said circuit, means in said circuit traversed by an inducing current proportional to the test current of the tube under test adapted to induce a grid current in said ballast tube, and indicating means actuated in proportion to the difference between said inducing current and said grid current.

3. Apparatus for testing thermionic emission tubes, comprising, a ballast tube having plate, grid and filament electrodes, a circuit connecting said ballast tube with the tube under test, means for impressing a supply voltage on said circuit, means in said circuit positively biasing said grid and imposing on said ballast tube a grid current substantially proportional to the test current of the tube under test, and indicating means differentially affected by said grid current and said test current.

4. Apparatus for testing thermionic emission tubes, comprising, a ballast tube having plate, grid and filament electrodes, a circuit connecting said ballast tube with the tube under test, means for impressing a supply voltage on said circuit, a transformer in said circuit having a primary winding, an adjusting circuit paralleling a portion of said winding, said parallel circuits being connected to be traversed by the test current of the tube under test, another portion of said winding being connected to impose upon said ballast tube a grid current induced by the current in said first portion of said winding, and indicating means affected differentially by said currents in said different winding portions.

5. Apparatus for testing thermionic emission tubes, comprising, a ballast tube having plate, grid and filament electrodes, a circuit in which said tubes and an indicating circuit are arranged in series, means for impressing a supply voltage on said first circuit; said indicating circuit including a transformer winding, current-regulating means connected across a portion of said winding, and another portion of said winding being connected to impose its induced voltage upon the grid circuit of said ballast tube; and indicating means connected to be actuated differentially by the currents in said winding portions.

6. The method of testing thermionic emission tubes, involving the use of a ballast tube having a grid comprising, passing a test current through the tube and the ballast tube in series while simultaneously imposing a positive voltage on the grid of the ballast tube, measuring a differential between the grid current and an oppositely phased component of said test current, and comparing the measurement with a similar measurement taken on a standard tube to indicate the quality of the tube under test.

7. The method of testing thermionic emission tubes, involving the use of a ballast tube having a grid comprising, passing a test current through the tube and the ballast tube in series under an impressed voltage, causing a change in the test current to impose an opposite change in the proportion of said impressed voltage absorbed by the tube under test, measuring a differential between the resulting grid current of the ballast tube and an oppositely phased component of said test current, and comparing the measurement with a similar measurement taken on a standard tube to indicate the quality of the tube under test.

VICTOR H. LAUGHTER.